April 30, 1940.                    J. F. WHITE                    2,199,298
                                   FISHING TOOL
             Filed Nov. 17, 1938                        2 Sheets-Sheet 1
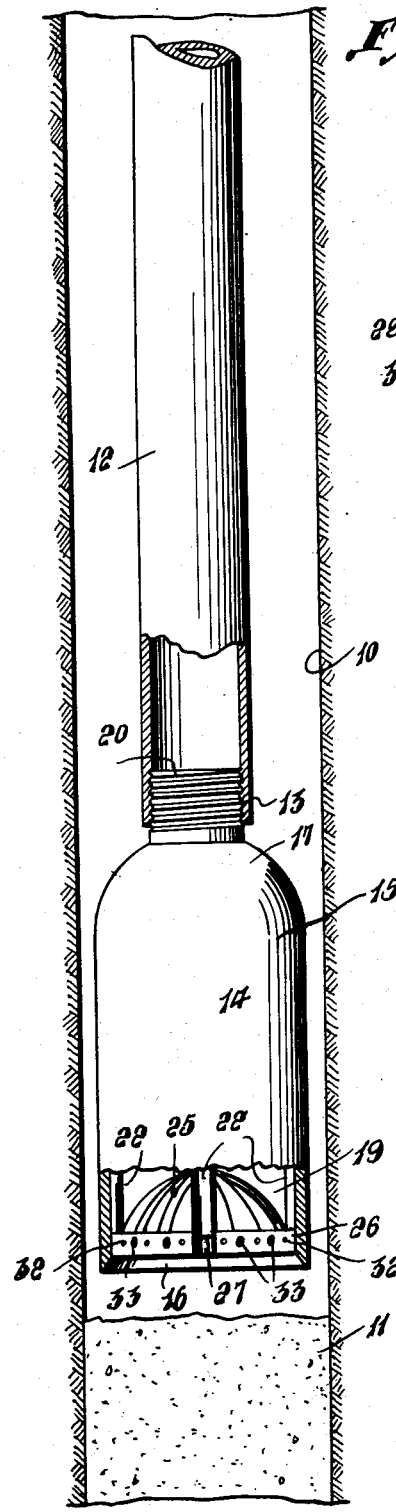
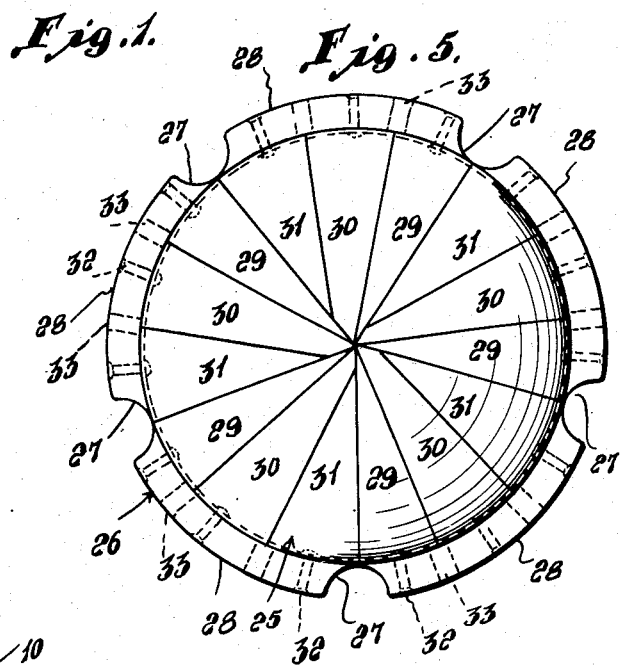
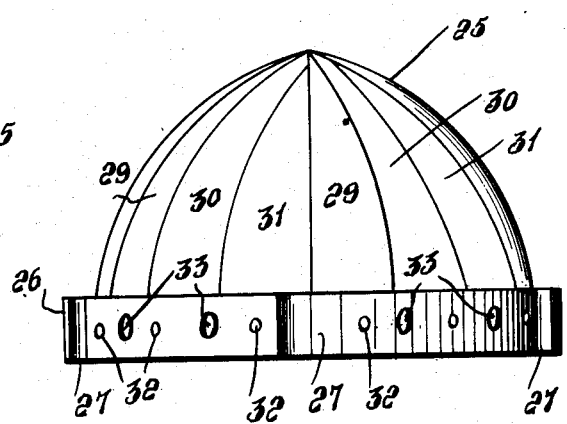
Inventor
John F. White
Attorney April 30, 1940.  J. F. WHITE  2,199,298
FISHING TOOL
Filed Nov. 17, 1938  2 Sheets-Sheet 2

Inventor
John F. White
By L. F. Kendrick
Attorney

Patented Apr. 30, 1940

2,199,298

UNITED STATES PATENT OFFICE 2,199,298

FISHING TOOL

John Fisher White, Eagle Pass, Tex.

Application November 17, 1938, Serial No. 241,044

3 Claims. (Cl. 166—19)

This invention relates to an improved fishing tool particularly adapted for use in removing articles from the bottom of oil wells that prohibits the continuation of drilling, or reduces or stops the flow from the pumping apparatus.

More particularly, it is an aim of this invention to provide a fishing tool constructed for reversing the flow of water under pressure therethrough to thereby force the article or fish, that is preventing operation of the well, upwardly into the tool, in which it will be trapped, and by which it may be removed with the tool.

More particularly, it is an aim of this invention to provide a tool adapted to be connected to a drill stem and provided with conduits communicating with the stem to convey water to the bottom of the tool and to discharge the water so that it will return upwardly through the tool, under pressure, to carry any foreign objects in the bottom of the well upwardly into the tool where they will be caught by a trap contained therein and held until the tool is removed from the well.

Figure 3:
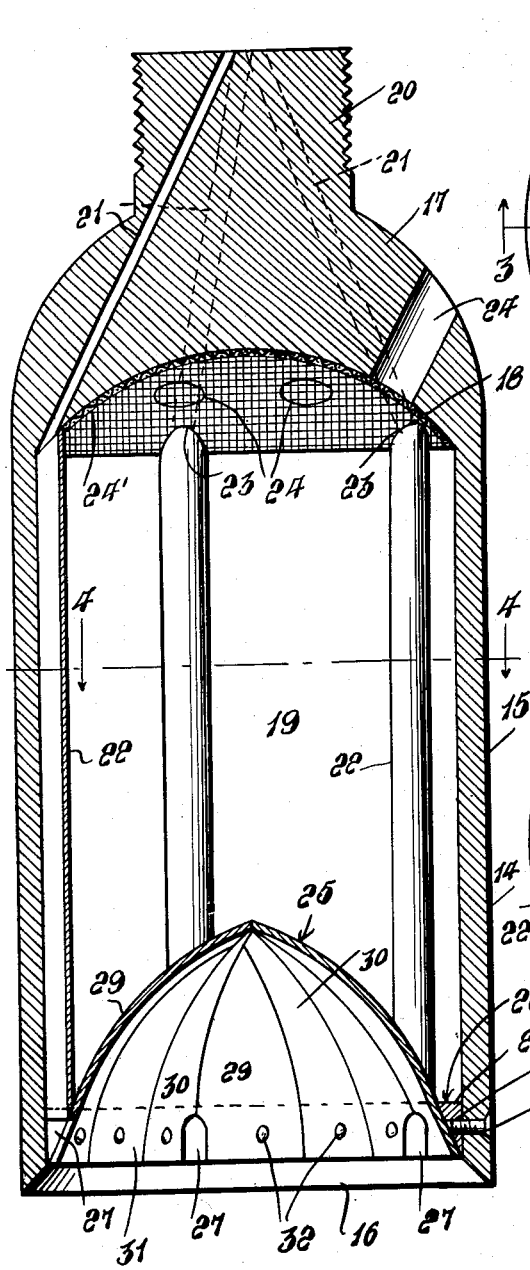
Figure 2:
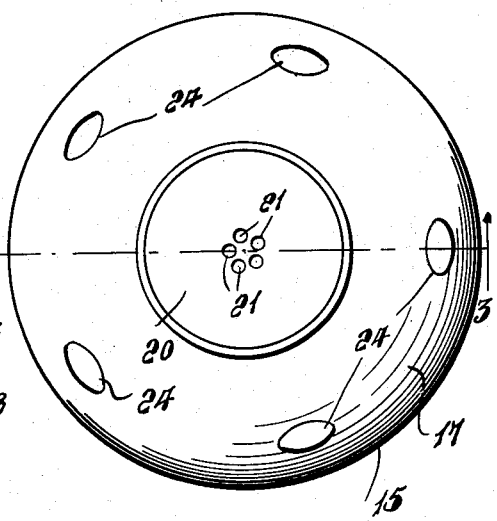
Figure 4:
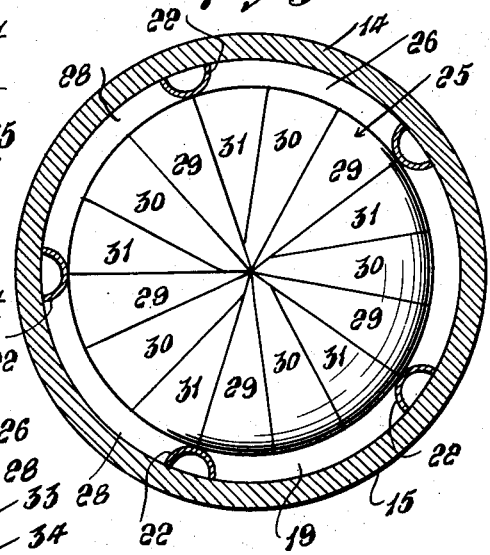

Other objects and advantages of the invention will hereinafter become more fully apparent, from the following description of the drawings, which illustrate a preferred embodiment thereof, and wherein:

Figure 1 is a side elevational view, partly in section, showing the assembled tool connected to a drill stem and positioned in a well, Figure 2 is a top plan view of the tool, Figure 3 is a longitudinal vertical sectional view taken along the line 3—3 of Figure 2, Figure 4 is a horizontal sectional view taken along the line 4—4 of Figure 3, Figure 5 is a top plan view of the spring trap, and Figure 6 is a side elevational view of the same.

Referring more particularly to the drawings, wherein like reference characters designate like or corresponding parts throughout the different views, 10 designates generally a well hole having a sand or mud bottom 11; and 12 designates a portion of a drill stem having an internally threaded lower end 13. These parts are shown and described merely to illustrate the invention, which will hereinafter be described, and form no part thereof.

The invention comprises the tool designated generally 14 which is provided with a cylindrical wall 15 which is open at its lower end and bevelled on its inner side, as indicated at 16. Wall 15 terminates at its upper end in the dome or bell shaped head 17 provided with the concave cavity 18 on its under side which communicates with the interior 19 of the tool 14, formed by the wall 15. Head 17 terminates at its upper end in a threaded nipple 20 adapted to be connected to the threaded end 13 of the drill stem 12, and it is to be understood that the nipple 20 may be of any desired size to fit drill stems of various diameters.

Head 17 is provided with a plurality of passages 21 which extend from points equidistant around the inner upper end of the wall 15 to converge and open outwardly of the nipple 20, as seen in Figure 2. Secured longitudinally of the inner side of the wall 15 are the semi-tubular members 22, which are disposed with their edges against the inner side of wall 15 to form conduits extending the length of the interior 19. Each of the members 22 communicate at their upper end with the diverging end of a passage 21 and are provided with the rounded ends 23, shaped to fit snugly against the cavity 18 to surround the outlet end of the passages 21 to form therewith a continuous conduit from the nipple 20 to a point adjacent the bottom of the wall 15.

Head 17 is provided with passages 24, which extend from the cavity 18 through the rounded outer side of the head and which are disposed between the passages 21. A lining of mesh wire fabric 24' is positioned in the cavity 18, as seen in Figure 3, to cover the inner ends of the passages 24.

A trap designated generally 25 includes a ring 26 which is tapered on its inner side, toward its lower end, as best seen in Figure 1. The ring 26 is provided with the spaced semi-circular recesses 27 and is divided intermediate of said recesses into the five sections 28. To the inner bevelled side of each of the sections 28 are secured the three arcuately shaped spring fingers 29, 30 and 31 by means of the fastenings 32. These spring fingers project upwardly and inwardly from the sections 28 so that when said sections are assembled, as in Figure 5, the three fingers of each of the five sections will combine to form a semi-spherical shaped member. Each of the sections 28 are provided with the drilled openings 33, disposed between the fastenings 32 and adapted to receive the screws 34 to removably mount the ring sections 28 in the open bottom of the wall 15 just above its bevelled face 16, so that said bevelled face will form substantially a continuation of the trap 25, as seen in Figure 3. The trap 25 is removably mounted in the open bottom of the tool 14 in an inverted position so that the fingers 29, 30 and 31 extend into the hollow interior 19. These fingers are formed of a resilient material so that under pressure from their inner sides they can open inwardly of the interior 19, as will hereinafter be explained. The semi-circular members 22 at their lower ends connect with the recesses 27, which open into the bevelled inner side of the ring 26 to form outlets for each of the members 22.

From the foregoing it will be seen, that a tool of simple construction has been provided adapted to be readily assembled on an end of a drill pipe 12 and to be lowered thereby into a well 10 until its bevelled open end 16 comes in contact with the bottom 11 of the well. By forcing a liquid under pressure downwardly through the tube 12, the liquid can be conveyed through the five passages 21 to the passages formed by the members 22 to be discharged radially inwardly through the openings formed by the recesses 27. Due to the inner movement of the discharge liquid and the lack of pressure in the chamber 19, the liquid will pass upwardly through the spring fingers of the trap 25 and due to its pressure will open said spring fingers, as heretofore explained. Since the lower end of the tool 14 is embedded in the bottom 11, the dirt or mud forming the bottom will naturally be carried upwardly into the chamber 19 and any article or fish, embedded therein will likewise be carried into this chamber. The liquid and the dirt or mud passed upwardly into chamber 19 will be discharged outwardly through the passages 24, the mesh wire fabric 24' being of sufficiently large mesh to allow dirt particles to pass therethrough, but being sufficiently small to prevent a tool or other fish that may have been dropped into the well and which has been drawn into the chamber 19, from discharging through openings 24. As soon as the discharge through the tool 14 ceases the spring fingers of trap 25 will again close to retain the fish therein so that when the stem 12 and the tool 14 are withdrawn from the well 10 the fish can be removed from the chamber 19 by removing trap 25.

It will thus be seen that the invention provides a reverse flow tool for retrieving articles dropped into a well, which are affecting the operation therein, and it is to be understood that other means may be provided to accomplish this reverse flow method.

It is therefore intended that various modifications and changes may be made in the construction and arrangement of the parts forming the invention, as only a preferred embodiment thereof has been illustrated and described, and the right is reserved to make such changes as do not depart from the spirit and scope of the invention as hereinafter defined by the appended claims.

I claim as my invention:

1. A well fishing tool comprising a member having a dome shaped head terminating at its upper end in a threaded nipple adapted to connect with a drill stem, a depending annular flange formed integral with said head to provide a hollow interior portion, outlet passages extending from the top of said nipple and discharging inwardly adjacent the bottom of said annular flange, return passages in said head through which a fluid which is discharged from said outlet passages can return through said member and be discharged therefrom, the combined cross sectional area of the return passages being greater than that of the discharge passages to prevent a back pressure in the hollow interior portion, and a spring trap mounted in the bottom of said member and opening inwardly to catch and retain articles carried into said member by said fluid, said trap being disposed above the discharge ends of the outlet passages.

2. A deep well fishing tool comprising a hollow body portion open at its bottom and provided with a bell shaped head terminating in a threaded nipple adapted to connect with a drill stem, a passage extending from the free end of said nipple and opening inwardly adjacent the bottom of said body portion, said head being provided with openings opening exteriorly of said body portion, and a spring trap mounted in the bottom of said body portion, above the lower end of the passage, and opening inwardly thereof for retaining articles carried upwardly into said member by a fluid passing upwardly therethrough, the cross sectional size of said opening being greater than that of the passage to prevent a back pressure being created in the body portion by the fluid.

3. A well fishing tool comprising a dome shaped head having an upwardly projecting threaded nipple for detachably connecting the tool to a drill stem, an annular apron depending from said head, the bottom edge of said apron being tapered on its inner side, a plurality of passages extending from the top to adjacent the bottom of said apron and disposed on the inner side thereof, passages extending from the free end of the nipple, through the head and opening into said first mentioned passages, a ring, a plurality of spring fingers connected to said ring, and forming a semi-sphere, said ring being mounted in the apron adjacent its open end with the semi-sphere extending inwardly thereof to form an inwardly opening trap, said ring having a plurality of openings communicating with said first mentioned passages and opening inwardly of said apron, and a plurality of passages extending through said head, said last mentioned passages being substantially larger than the aforementioned passages.

JOHN FISHER WHITE.